US011110757B2

(12) United States Patent
Guinart et al.

(10) Patent No.: US 11,110,757 B2
(45) Date of Patent: Sep. 7, 2021

(54) METHOD FOR LOCATING A POSITION OF EACH WHEEL OF A MOTOR VEHICLE ASSOCIATED WITH AN ELECTRONIC DEVICE

(71) Applicants: Continental Automotive France, Toulouse (FR); Continental Automotive GmbH, Hannover (DE)

(72) Inventors: Nicolas Guinart, Toulouse (FR); Sébastien Plancke, Tournefeuille (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 64 days.

(21) Appl. No.: 16/631,950

(22) PCT Filed: Jul. 16, 2018

(86) PCT No.: PCT/FR2018/051794
§ 371 (c)(1),
(2) Date: Jan. 17, 2020

(87) PCT Pub. No.: WO2019/016455
PCT Pub. Date: Jan. 24, 2019

(65) Prior Publication Data
US 2020/0180369 A1    Jun. 11, 2020

(30) Foreign Application Priority Data
Jul. 20, 2017   (FR) ...................................... 1756865

(51) Int. Cl.
*B60C 23/04*    (2006.01)
(52) U.S. Cl.
CPC ........ *B60C 23/042* (2013.01); *B60C 23/0416* (2013.01); *B60C 23/0488* (2013.01)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS 7,487,670 B2    2/2009 Fink et al.
2004/0066290 A1*    4/2004 Hernando ........... B60C 23/0416
340/447
(Continued)

FOREIGN PATENT DOCUMENTS

DE    10250942 A1    5/2004
DE    102005018107 B3    10/2006
(Continued)

OTHER PUBLICATIONS

International Search Report and Written Opinion for International Application No. PCT/FR2018/051794, dated Oct. 31, 2018, 8 pages.

*Primary Examiner* — Andre J Allen
(74) *Attorney, Agent, or Firm* — RatnerPrestia

(57) ABSTRACT

A method for locating at least one wheel of a vehicle, the wheels each being equipped with an electronic device which sends a wheel rotation signal to a central unit, a speed sensor for each wheel which supplies a signal to the central unit. For each electronic device, at least two sequences of several acquisitions are performed by formation of the signal with simultaneous acquisition by the central unit of the signal transmitted by each speed sensor. A pairing is performed of the two signals for an electronic device with each of the wheel speed signals. For each pair, a phase offset is measured between the two signals. When a constant phase offset is measured in the pairs with a speed sensor, the electronic device associated with the signal is identified as being assigned to the wheel associated with the speed sensor.

13 Claims, 2 Drawing Sheets

(58) Field of Classification Search
CPC .... G01M 17/024; G01M 17/10; G01M 1/045; G01M 7/08; G01M 17/0076; G01M 17/013; G01M 17/03; G01M 17/04; G01M 17/06; G01M 17/08; G01M 1/02; G01M 1/12; G01M 1/16; G01M 1/225; G01M 3/04; G01M 3/40; G01M 5/0091; G01M 7/02; G01M 99/00; G01M 99/002; B60C 23/0494; B60C 2019/004; B60C 23/0493; B60C 23/064; B60C 19/00; B60C 23/04; B60C 23/0488; B60C 23/0498; B60C 23/0496; B60C 23/0408; B60C 23/041; B60C 23/0411; B60C 23/06; B60C 23/20; B60C 11/246; B60C 23/0486; B60C 23/061; B60C 11/243; B60C 99/00; B60C 11/0083; B60C 13/003; B60C 2009/2038; B60C 23/004; B60C 23/02; B60C 23/0401; B60C 23/0406; B60C 23/0416; B60C 23/0433; B60C 23/0455; B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/00; B60C 23/001; B60C 23/003; B60C 23/007; B60C 23/008; B60C 23/0413; B60C 23/0427; B60C 23/0447; B60C 23/0454; B60C 23/0457; B60C 23/0462; B60C 23/0471; B60C 23/0472; B60C 23/0476; B60C 23/0479; B60C 23/0483; B60C 23/0484; B60C 23/065; B60C 23/066; B60C 23/10; B60C 25/0548; B60C 25/056; B60C 25/132; B60C 25/138; B60C 29/005; B60C 9/005; B60C 9/18; B60C 9/1807; B60C 9/20; B60C 9/28

USPC .................................................. 73/146–146.8

See application file for complete search history.

(56) References Cited

U.S. PATENT DOCUMENTS

| | | |
|---|---|---|
| 2006/0012469 A1 | 1/2006 | Hirai |
| 2006/0087420 A1 | 4/2006 | Walraet |
| 2011/0082663 A1 | 4/2011 | Geisler et al. |
| 2012/0200408 A1 | 8/2012 | Gotschlich et al. |
| 2013/0166166 A1 | 6/2013 | Steiner et al. |
| 2014/0019003 A1 | 1/2014 | Guinert et al. |
| 2016/0273941 A1* | 9/2016 | Hackner ................ G01D 5/147 |
| 2018/0216965 A1* | 8/2018 | Richard ................. G01D 5/165 |
| 2018/0257441 A1* | 9/2018 | Maehara ............. B60C 23/0489 |

FOREIGN PATENT DOCUMENTS

| | | |
|---|---|---|
| DE | 102012201796 A1 | 8/2012 |
| EP | 1616723 A1 | 1/2006 |
| FR | 2869839 A1 | 11/2005 |
| FR | 2974033 A1 | 10/2012 |

* cited by examiner

METHOD FOR LOCATING A POSITION OF EACH WHEEL OF A MOTOR VEHICLE ASSOCIATED WITH AN ELECTRONIC DEVICE

CROSS REFERENCE TO RELATED APPLICATIONS

This application is the U.S. National Phase Application of PCT International Application No. PCT/FR2018/051794, filed Jul. 16, 2018, which claims priority to French Patent Application No. 1756865, filed Jul. 20, 2017, the contents of such applications being incorporated by reference herein.

FIELD OF THE INVENTION

The present invention concerns a method for locating a position of each wheel of a motor vehicle comprising wheels each equipped with an electronic device. Each electronic device integrates at least one sensor for an operating parameter correlating with a rotation of the associated wheel, and an emitter transmitting the values of said at least one operating parameter to a central unit. In parallel, a wheel speed sensor for each wheel, which is independent of the electronic device, supplies data representative of the rotation of the associated wheel to the central unit.

BACKGROUND OF THE INVENTION

More and more motor vehicles have, for safety reasons, monitoring systems comprising sensors mounted on each of the wheels of vehicles, these being dedicated to measuring parameters, such as pressure and/or temperature of the tires fitted to these wheels, and intended to inform the driver of any abnormal variation in the measured parameter. These monitoring systems are conventionally equipped with an electronic device mounted on each wheel of the vehicle, and containing, as well as said sensors, a microprocessor, a radio-frequency transmitter, and a unit for receiving the signals transmitted by the transmitters of said central unit, this central unit comprising a computer integrating a radio-frequency receiver connected to an antenna. Such an electronic device often comprises a sensor for detecting rotation of the wheel and transmits this information to the central unit.

One of the problems facing such monitoring systems is the obligation to associate data concerning the location of the electronic device, and hence of the wheel from which the signal originates, with each signal received by the receiver of the central unit; this obligation persists throughout the life of the vehicle, i.e. must be respected even after changes of wheel or simple reversals of position of these wheels.

Many methods are currently proposed for locating the position of the wheels of the vehicle, the concept of which is based on the existing correlation between the signal supplied by a wheel rotation detection sensor integrated in the electronic device fitted to a wheel, and the signals supplied by a wheel speed sensor mounted on the vehicle close to this wheel. Most modern vehicles are equipped with active safety systems such as ABS (anti-lock braking system) or ESP (dynamic stability control system), wherein such location methods are of particular interest with respect to installation costs because the wheels are located by correlating the signals emitted by the speed sensors of the active safety system and the signals supplied by the wheel rotation detection sensors, which are normally integrated in the electronic devices of the monitoring system.

Document FR-A-2 974 033, incorporated herein by reference, describes a method for locating the position of wheels of a vehicle equipped with an electronic device which integrates means for measuring the angular position of the electronic device and a transmitter intended to transmit signals containing data representative of operating parameters of each wheel and an identification code of the electronic device.

Positioned on the vehicle close to each wheel is a wheel speed sensor which is able to supply, in the form of values which can be converted into angular values, data representative of the orientation of the wheel. A central unit is firstly equipped with a receiver for receiving signals from the electronic devices, and secondly is connected to the various wheel speed sensors.

The location method in this document comprises the issue of a signal for each electronic device; said first signal is transmitted for a given angular position of the electronic device, then at successive moments successive signals are transmitted for the angular positions of the electronic device, which may or may not be offset by angular values determined relative to the angular position of transmission of the first signal. Each signal comprises the identification code of an electronic device and data representative of the angular position of transmission.

The central unit connects the values, which can be converted into angular values, measured by each of the wheel speed sensors at each of the successive moments, and for each series of angular values corresponding to values measured by each wheel measurement sensor, calculates a characteristic value representative of the spread of the series of values.

Then by comparison of the characteristic values, the series of angular values which is most closely grouped is then selected. The identification code of the electronic device is then assigned to the position of the wheel situated close to the wheel speed sensor from which the series of angular values most closely grouped originated.

This method for detecting the angular position requires restrictive digital processing, taking into account the resources of the electronic device. Because of these restrictions, the performance or accuracy of the function is degraded in a number of identified usage cases, such as for example strong vehicle dynamics or poor road condition.

Furthermore, such a process always requires more calculation resources and most often leads to an increase in energy consumption and hence to a reduction in the service life of the electronic device.

SUMMARY OF THE INVENTION

The problem on which an aspect of the present invention is based is to locate each wheel of the motor vehicle associated with an electronic device by comparison of the wheel position signals emitted by the electronic device with the wheel position signals emitted by a wheel speed sensor not associated with the electronic device, wherein this comparison must be made by simple means not involving significant calculation resources, while reinforcing the robustness of location in unfavorable usage cases.

To this end, an aspect of the present invention concerns a method for locating a position of each wheel of a motor vehicle comprising wheels each equipped with an electronic device which integrates at least one sensor for an operating parameter correlating to a rotation of the associated wheel, and an emitter transmitting values of said at least one operating parameter to a central unit, a wheel speed sensor for each wheel which supplies data representative of the rotation of the associated wheel to said central unit, said location method being distinguished in that:
- for each electronic device, at least two sequences of several acquisitions of said at least one parameter are performed, which are then transmitted by the electronic device to the central unit by formation of a signal correlating to the rotation of the associated wheel for said at least two sequences, with simultaneous acquisition by the central unit of data representative of the rotation transmitted by each wheel speed sensor by formation of a signal associated with each wheel speed sensor acquired during each of said at least two sequences,
- a pairing is performed of the signal correlating to the wheel rotation for the electronic device for said at least two sequences with each of the signals associated with each of the wheel speed sensors,
- for each pair, a phase offset is measured between the signal correlating with the rotation of the wheel associated with the electronic device and the signal associated with each wheel speed sensor, and
- when a constant phase offset varying within a predefined calibratable range is measured in the pairs of said at least two sequences with the signal associated with the wheel speed sensor, while the other pairs with the signals associated with the other wheel speed sensors have a greater or variable phase offset, the electronic device associated with said at least one signal correlating with the wheel rotation is identified as being assigned to the wheel associated with the wheel speed sensor which emitted the signal of the wheel speed sensor having a constant phase offset from the signal of the electronic device,
- the method being continued for associating a wheel of the vehicle to each electronic device.

The technical effect is simple recognition of the wheel to which the electronic device is assigned. It was not previously directly possible for the central unit to recognize which wheel was associated with a signal from an electronic device.

To do this, an aspect of the present invention uses exchanges between the speed sensors and the central unit which are independent of exchanges between the electronic devices and the central unit. The wheel speed sensors may be used in anti-lock braking systems and are present on all motor vehicles.

During the travel of the motor vehicle, because of the meandering nature of the route and the differences in travel of the wheels, each electronic device of the wheel sends signals correlating with the wheel rotation with a phase which is specific to the associated wheel. The wheel speed sensors, which are independent of the electronic devices of the wheel, send signals to the central unit with a phase specific to the associated wheel, such that for a same associated wheel, the relative phase offset between the signal from the electronic device and the signal from the speed sensor is also specific to the associated wheel. As the wheel associated with a wheel speed sensor is known, recognizing the signals from a wheel speed sensor and from an electronic device having a constant relative phase offset allows the wheel associated with the speed sensor to be attributed to the device.

The other electronic devices may have a greater or variable phase offset with the wheel speed sensor, and are recognized as not being associated with the wheel of the wheel speed sensor.

At least two measurement sequences are necessary to establish that the phase offset between the electronic device signals and the wheel speed sensor signals remains constant, in order to guarantee reproducibility of a recorded phase offset. In view of the uncertainty of the measurements taken, the phase offset may not be constant, and a phase offset is taken which lies within a predefined range allowing for measurement errors, wherein the measured phase offsets may not always be exactly the same.

The method may be performed at the same time with all electronic devices and all speed sensors, advantageously four speed sensors and four electronic devices for a four-wheeled motor vehicle. In this case, 16 pairs of signals from electronic devices and signals from wheel speed sensors must be compared in order to obtain all wheel locations.

An aspect of the present invention simplifies the function of location with respect to the electronic device with lower calculation resources and energy consumption compared with the closest prior art, which required more calculation resources. Furthermore, the method according to an aspect of the present invention is not sensitive to the worst usage cases of transmission between electronic devices and the central unit.

The location method of an aspect of the present invention is particularly suitable for the performance of current electronic devices, and performs extremely well in terms of reactivity and reliability. Certain malfunction risks, resulting in particular from possible deterioration in the quality of signals supplied by the speed sensors of active safety systems, are avoided by using a calibratable range around a constant phase offset as a basis for decision.

Advantageously, the predefined calibratable range varies from 0 to 15%, being a function of a travel of the motor vehicle. Preferably, more precisely an acceptable variation range of the phase offset may be 45° (+/−22.5°), or 12.5% (+/−6.25%).

Certain travel conditions are unfavorable for taking measurements, such as for example vehicle speed or meandering nature of the road. In these cases, the predefined range is increased. In other travel conditions, this range may be reduced.

Advantageously, when no constant phase offset is measured in any of the pairs with the signals associated with the wheel speed sensors, or when the phase offsets of the pairs with the signals associated with the wheel speed sensors are similar, the method is suspended for said at least two acquisition sequences.

In fact it may not be possible to attribute an electronic device to a wheel with certainty if the phase offsets of the various pairs of signals of an electronic device with the signals of the various respective sensors give phase offsets which are similar or too variable. In this case, no wheel is attributed to a given electronic device and the method begins again.

Advantageously, the central unit memorizes the recorded phase offsets and classifies these into measured phase offset groups with similar characteristics as a function of the following parameters, taken alone or in combination: a journey of the vehicle corresponding to a specific speed or within a non-limitative range of 15% around a specific speed, a journey with one or more phases of stoppage or deceleration of the vehicle, or a meandering course of the route followed.

In this preferred embodiment, a learning is performed of the recorded phase offset as a function of the specific travel conditions which led to recording of similar phase offsets. This allows a phase offset value to be anticipated when the conditions of a group of measured phase offsets are present, for example a given speed or similar meandering nature of the route followed. It is of course possible to update the values of the group with the new recorded phase offset value.

Advantageously, for a classified phase offset group with similar characteristics as a function of said parameters and composed of a set of phase offsets, a mean phase offset value and a standard deviation of phase offsets around this mean value are established, this mean phase offset value and the standard deviation phase offset being applied to a new journey with said characteristics of the group, the phase offset of said new journey being then stored in the group and the standard deviation of the phase offsets being updated taking into account the phase offset of the new journey.

The justification for classification into several groups is that following stoppage of the vehicle, it is possible to lose the angular reference of the wheel speed sensors: this is related to the above-mentioned "specific phase of the signal of the speed sensors".

The classification would then correspond to continuous travel phases i.e. without stoppage, and the criterion of convergence would then be based on the mean value of the standard deviation from one group to another. If this mean of all standard deviations is small, it can be interpreted that over all groups, the phase offset variations are small, whatever the absolute value of this phase offset for a given group, and the electronic device can be assigned to the wheel associated with the speed sensor.

Conversely, if this mean standard deviation is great, this would mean that the phase offset is not constant and the pair considered is not good. The ranges around a constant phase offset are then predefined as a function of recognized travel conditions, wherein a larger or smaller range is then attributed. This allows refinement of decision-making with respect to recognition of a constant phase offset between the signals of the electronic device and the signals of the wheel speed sensor. Also, a geolocation system may be used to determine the route followed by the vehicle and determine its meandering nature.

Advantageously, each electronic device transmits to the central unit an acquisition period of said at least two acquisition sequences, said at least two acquisition sequences undergoing filtration in the associated electronic device and/or the central unit.

For a signal originating from an electronic device towards the central unit, filtration may be performed in the electronic device then in the central unit, provided that the filtrations are mutually coherent and do not distort the signal of the electronic device by adding the filtration phase offsets.

Secondly, the central unit may perform filtration of the signal of a wheel speed sensor intended to be paired with a signal from at least one electronic device, wherein this filtration of the wheel speed sensor signal must be compatible with the filtration(s) of the signal from the electronic device in order to recognize, where applicable, a constant phase offset while reducing the uncertainty range surrounding this phase offset. This gives a same supplementary phase offset resulting from the digital filtration for the wheel speed sensor signal and the electronic device signal, allowing better identification of a constant phase offset.

Advantageously, the signals associated with the wheel speed sensors are resampled as a function of the period of said at least two sequences and undergo filtration similar to the filtration(s) of said at least two acquisition sequences. This allows limiting of the uncertainty range around the phase offset between the wheel speed sensor signals and the electronic device signals.

Advantageously, each acquisition sequence corresponds to a minimum wheel revolution and/or a period of an acquisition sequence of at least five milliseconds. This acquisition sequence must be sufficiently long to allow recreation of an electronic device signal and its comparison with the signals of each wheel speed sensor in order to select a wheel speed sensor of which the signal has a constant phase offset from the signal of the electronic device.

Advantageously, sampling is performed at a fixed and predefined period of at least five milliseconds or a period calculated and adapted to the current speed in order to guarantee a fixed number of samplings per wheel revolution.

A period of five milliseconds guarantees at least six samples per wheel revolution when running at high speed, for example 30 Hz wheel frequency, and conversely requires 64 samples to cover a complete wheel revolution at very low speed with a wheel frequency of 3 Hz. In the case of the second solution, it is then necessary to transmit the value of the sampling period to the central unit in order to allow implementation of mechanisms compensating for any errors linked to establishment. The latter solution is preferred in an electronic device architecture with accelerometer, which architecture is not limitative.

An aspect of the invention also concerns a motor vehicle comprising wheels each equipped with an electronic device which integrates at least one sensor for an operating parameter correlating to a rotation of the associated wheel and an emitter transmitting values of said at least one operating parameter to a central unit, the motor vehicle comprising a wheel speed sensor positioned close to each wheel which supplies data representative of the rotation of the associated wheel to said central unit, the central unit housed in the vehicle being firstly equipped with a receiver for receiving the values of said at least one parameter from the electronic devices, and secondly connected to each wheel speed sensor for receiving data representative of the rotation of each wheel, which is distinguished in that it implements such a method, wherein each electronic device comprises means for implementing at least two sequences of several acquisitions correlating to the rotation of the wheel, the central unit comprises means for pairing a signal representative of said at least two sequences separately with each of the signals associated respectively with one of the wheel speed sensors, and means for measuring for each pair a phase offset between the signal correlating with the rotation of the wheel associated with the electronic device and the signal associated with each wheel speed sensor, means for identifying a constant phase offset between the signal correlating with the wheel rotation and a signal from one of the wheel speed sensors, and means for attribution and memorization of the electronic device for the wheel associated with the wheel speed sensor, the signal of which has shown a constant phase offset from the signal of the electronic device.

Implementing the location method according to an aspect of the present invention simply requires execution of a software for processing the signals supplied but requires no addition of specific equipment, the safety system with the wheel sensors being already present in the motor vehicle.

Advantageously, said at least one sensor of an operating parameter integrated in the electronic device correlating with a rotation of the associated wheel is taken individually or in combination from the following elements: a tangential and/or radial accelerometer, an impact sensor, a coil sensitive to the earth's magnetic field, and a Hall effect sensor.

Advantageously, when at least one sensor is a coil sensitive to the earth's magnetic field, a magneto-static sensor or a Hall effect sensor, the motor vehicle comprises a global positioning system on board the motor vehicle. Such a positioning system may also serve to determine the route followed by the vehicle and estimate the meandering nature of the route followed, which will be taken into account for comparison of phase offsets.

BRIEF DESCRIPTION OF THE DRAWINGS

Other features, aims and advantages of aspects of the present invention will become apparent upon reading the detailed description that will follow and upon examining the appended drawings, given by way of non-limiting examples and in which.

DETAILED DESCRIPTION OF THE PREFERRED EMBODIMENTS

Figure 1:
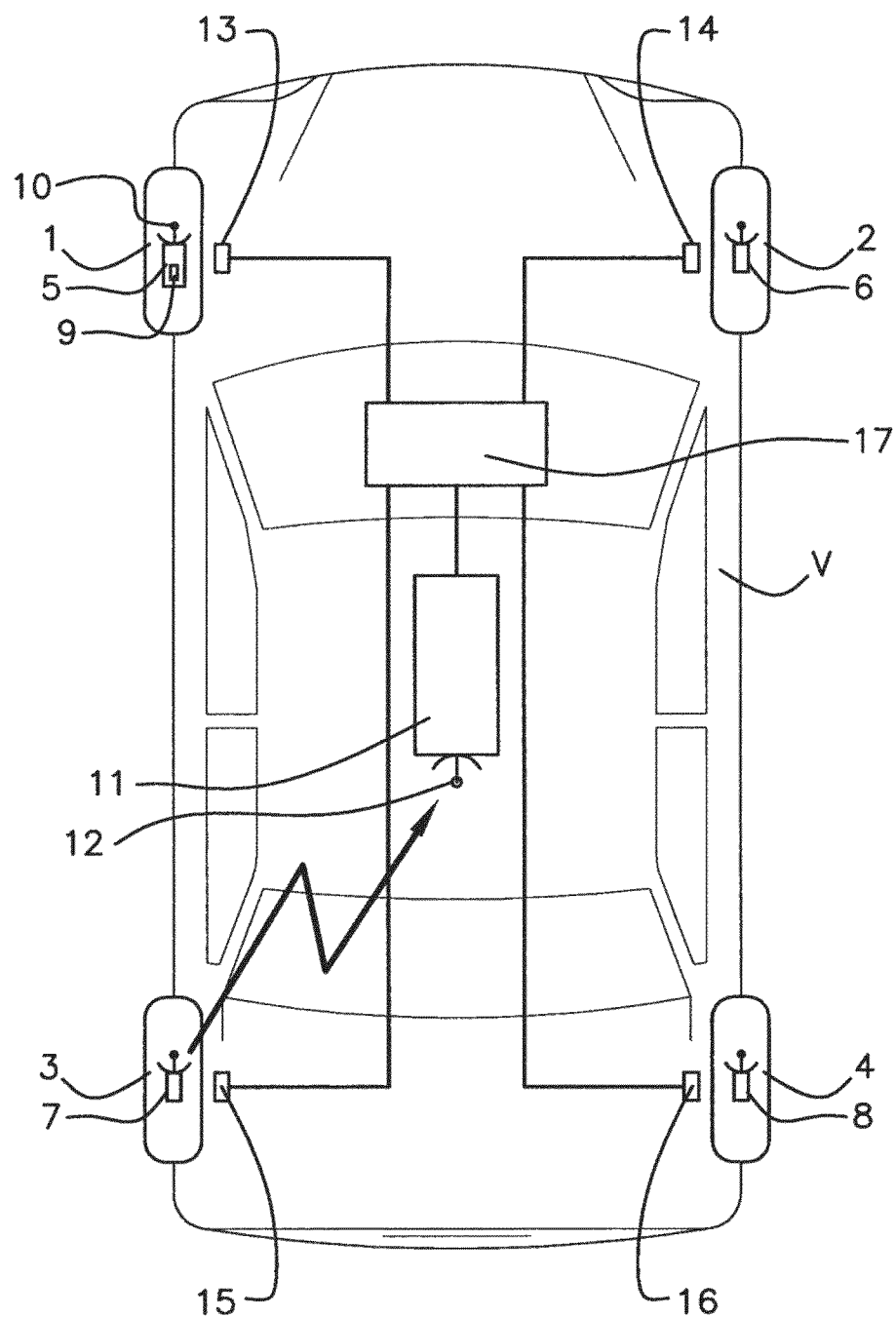
FIG. 1 is a diagrammatic depiction of a top view of a vehicle equipped with a monitoring system and an active safety system allowing implementation of the method for locating the position of the vehicle wheels according to an aspect of the invention.

FIG. 1 shows a vehicle V in which the method of locating each wheel according to an aspect of the present invention may be implemented, although showing elements which are known in themselves. In the context of an aspect of the present invention, it could be possible to locate only a single wheel or not all wheels of the vehicle, but this would have merely minimal interest since location of all vehicle wheels may be performed simultaneously.

FIG. 1 shows a monitoring system which conventionally comprises firstly an electronic device 5-8 associated with each wheel 1-4, for example attached to the rim of the associated wheel so as to be positioned inside the envelope of the tire fitted to the wheel.

Each of these electronic devices 5-8 incorporates sensors, which are often dedicated to measuring tire parameters, connected to a microprocessor calculation unit connected to an emitter 10. Each of these electronic devices 5-8 also, in the conventional way, incorporates means 9 for measuring the angular position of the electronic device 5-8 containing them. Such measurement means 9 may advantageously consist of an accelerometer capable of supplying modulated signals indicative of the values of gravity, and therefore of the angular position of the electronic device 5-8, and of which the frequency, equal to the rotation frequency of the wheels 1-4, allows calculation of the rotational speed of said wheels 1-4.

In addition to the possibility of being a tangential accelerometer, a radial accelerometer or a radial and tangential accelerometer, in the context of an aspect of the present invention the measurement means 9 may also take the form of an impact sensor, a coil sensitive to the earth's magnetic field, or a Hall effect sensor. Other elements are also possible, such as for example any magneto-static sensor.

The monitoring system also comprises a central unit 11 situated within the vehicle V, including a microprocessor and incorporating a receiver 12 able to receive the signals emitted by the emitters 10 of each of the four electronic devices 5-8.

In parallel with and independently of the monitoring system, the vehicle V is also equipped with an active safety system such as ABS (anti-lock braking system) for the wheels 1-4, or ESP (dynamic stability control system). The safety system comprises four wheel speed sensors 13-16 positioned on the vehicle V, each near to one wheel 1-4, and designed to supply, in the form of values that can be converted into angular values, data indicative of the orientation of the associated wheel 1-4. The location on the vehicle V of each of these wheel speed sensors 13-16 is known, i.e. it is known with which wheel each of these wheel speed sensors 13-16 is associated.

In addition, this active safety system comprises an ABS or ESP computer 17 connected to the various wheel speed sensors 13-16, so as to receive the wheel speed information measured by said sensors and programmed to anticipate the control needed in order to prevent the wheels 1-4 from locking. In the usual way, the wheel speed sensors 13-16 consist of inductive, magneto-resistive or Hall effect sensors designed to measure the rotational speed of each wheel 1-4 on a toothed or magnetic wheel.

With the aim of locating each wheel 1-4 on the vehicle V, the method for locating a position of at least one wheel 1-4, and more advantageously each wheel of a motor vehicle V, according to an aspect of the invention consists of using the data provided firstly by the electronic devices 5-8 and secondly by the wheel speed sensors 13-16 in order to compare their phase offset. Each electronic device 5-8 supplies a signal for a given angular position of the electronic device 5-8 followed by two successive signals for the angular positions of the electronic device 5-8 offset by angular values determined relative to the angular position of transmission of the first signal.

In parallel, sensors 13-16 supply to the computer 17 data representative of the orientation of the associated wheels 1-4, in the form of values which can be converted into angular values, which is frequently the sequential number of a tooth of a toothed wheel rotating with the wheel.

Figure 2:
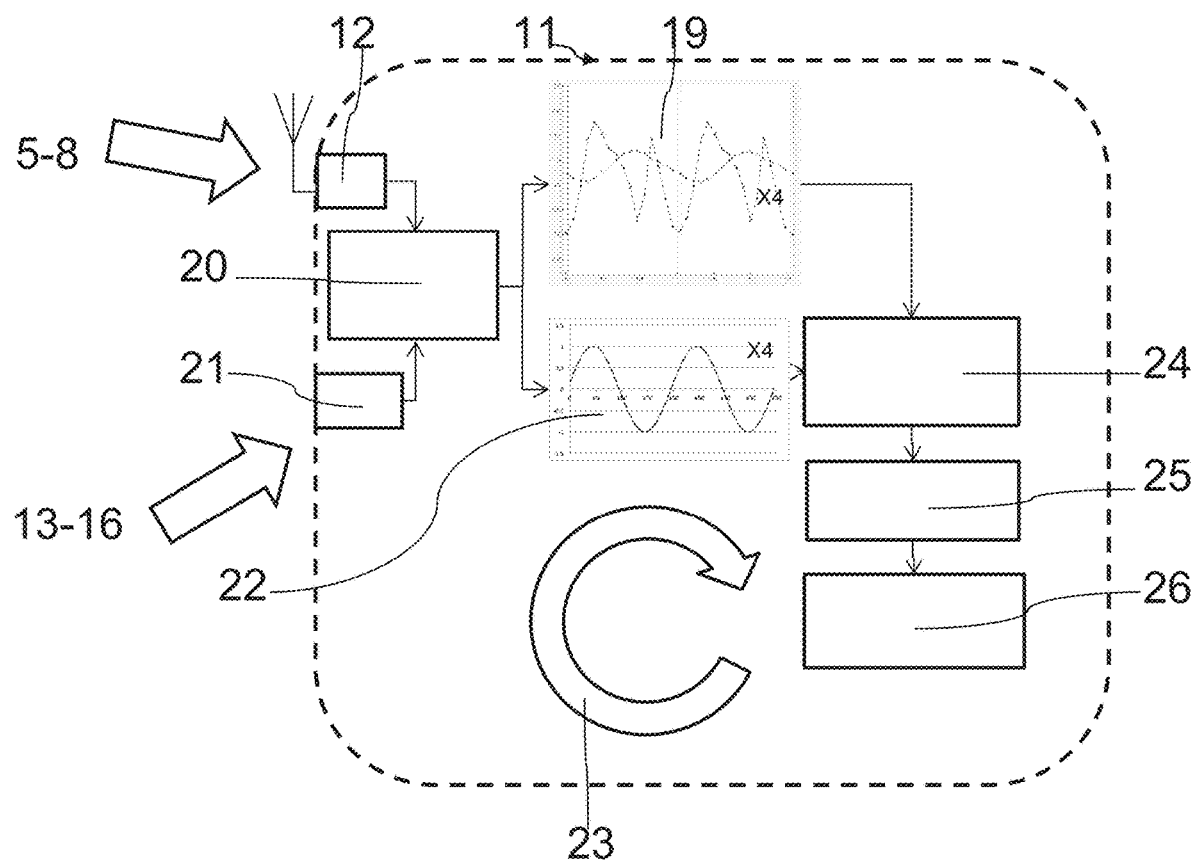
FIG. 2 is a diagrammatic depiction of the implementation of the method according to an aspect of the present invention in a central unit connected firstly to each wheel electronic device of a wheel monitoring system, and secondly to each wheel speed sensor of an active safety system.

With reference now to FIGS. 1 and 2 taken in combination, according to an aspect of the invention, for each electronic device 5-8, at least two sequences are performed of several acquisitions of said at least one parameter which correlates with the rotation of the wheel associated with the electronic device 5-8, without this wheel being determined. The sequences of several acquisitions are then transmitted by the electronic device 5-8 to the central unit 11 by formation of a signal correlating with the rotation of the associated wheel for said at least two signals.

FIG. 2 shows that the electronic devices 5-8 transmit via radio frequency the signals resulting from processing of the useful signals 19 to the central unit 11, this central unit 11 being equipped with a radio-frequency receiver 12. The signals from each electronic device 5-8 may be subjected to filtration 20 in the central unit 11, but this is not mandatory.

In parallel and simultaneously, originating from the wheel speed sensors 13-16, the central unit 11 acquires the data representative of the rotation which is transmitted by each wheel speed sensor 13-16 by formation of a signal associated with each wheel speed sensor 13-16 acquired during said at least two sequences. These signals from wheel speed sensors 13-16 are marked 22 in FIG. 2, where applicable after filtration and/or resampling.

These wheel speed sensor signals 22 may be received by a receiver of a system for data transmission via an internal network 21 of the vehicle, for example a bus multiplex system known as CAN, and may then be subjected to filtration 20, advantageously similar to or compatible with the filtration applied to the signals originating from each of the electronic devices 5-8.

A pairing is performed of the signal correlating to the wheel rotation for the electronic device 5-8 for said at least two sequences with each of the signals associated with each of the wheel speed sensors 13-16. When the vehicle V has four wheels 1-4, the signal coming from each electronic device 5-8 is paired respectively with four signals originating from the four wheel speed sensors 13-16, giving 16 pairs. This takes place in a pairing or coupling module 24.

Then for each pair, a phase offset is measured between the signal correlating with the rotation of the wheel associated with the electronic device 5-8 and the signal associated with each wheel speed sensor 13-16. This takes place in a phase offset comparison module 25.

When, in the phase offset comparison module 25, a constant phase offset varying within a predefined calibratable range is measured in the pairs of said at least two sequences with the signal associated with the wheel speed sensor 13-16, while the other pairs with the signals associated with the other wheel speed sensors 13-16 have a greater or variable phase offset, the electronic device 5-8 associated with said at least one signal correlating with the wheel rotation is identified as being assigned to the wheel associated with the wheel speed sensor 13-16 which emitted the signal of the wheel speed sensor 13-16 having a constant phase offset from the signal of the electronic device 5-8.

This leads to decision-making and the allocation of a wheel to the electronic device in a decision module 26. The method is continued for the other electronic devices 5-8 in order to associate a wheel of the vehicle V to each electronic device 5-8.

The symbol 23 indicates that the method is applied to at least two sequences of several acquisitions so that the phase offset comparison is reproducible over several acquisition sequences.

As signals may be deformed in particular depending on unfavorable travel conditions such as the meandering nature of the route, the state of the road or the speed of the vehicle V, the phase offsets are assessed as being a range around a constant phase offset. This predefined calibratable range may vary from +/−0 to 15%, being a function of the journey of the motor vehicle.

Preferably, more precisely an acceptable variation range of the phase offset may be 45° (+/−22.5°), or 12.5% (+/−6.25%), i.e. varying by +/−6.25%.

For example, at high speed the range may be more reduced than at low speed. The influence of travel conditions on the variations in phase offset around a constant phase offset for the electronic device 5-8 to be associated with a wheel speed sensor 13-16 of a wheel and allocated to this wheel may be determined by experimentation. This will be described in greater detail later.

Filtration performed in each electronic device 5-8 as applicable, associated with filtration performed in the central unit 11 with adaptation of the signal from each wheel speed sensor 13-16 to allow better comparison with the signal from the electronic device 5-8, may reduce the range around the constant phase offset provided that the different filtration steps are compatible and correct the signal in the same direction.

When no constant phase offset is measured in any of the pairs with the signals associated with the wheel speed sensors 13-16, or when the phase offset of the pairs with the signals associated with the wheel speed sensors 13-16 are similar, the method is suspended for said at least two acquisition sequences. The method then begins again under more favorable conditions. A suspension period may be set.

The central unit 11 may memorize the recorded phase offsets and classify these into measured phase offset groups with similar characteristics as a function of certain travel parameters of the vehicle V. These parameters may be the following non-limitative parameters, taken alone or in combination: a journey of the vehicle V corresponding to a specific speed or within a range of 0 to 15% around a specific speed, a journey with one or more phases of stoppage or deceleration of the vehicle V, or a meandering course of the route followed.

This allows a reduction in the uncertainty range around a historically found phase offset for certain travel conditions which are favorable in relation to the constant phase offset. For example, knowing the route followed and knowing that the vehicle V is in a situation where a constant phase offset may be favorably recognized, it is possible to establish an anticipated phase offset and see whether this is actually the case in the comparison of phase offsets. The association of an electronic device 5-8 with a wheel speed sensor 13-16 is then performed more easily and does not require as much calculation as in the case without knowledge of the travel conditions.

For a classified phase offset group with similar characteristics as a function of said parameters and composed of a set of phase offsets, a mean value of phase offset and a standard deviation of offsets around this mean value may be established. This mean value of phase offset and standard deviation of phase offsets are applied to a new journey having said characteristics of the group. The phase offset of this new journey is then stored in the group and the standard deviation of the phase offsets is updated taking into account the phase offset of the new journey.

The calculated phase offsets are then classified into groups which correspond to successive phases of continuous movement of the vehicle V, where applicable interrupted by stoppages of the vehicle V.

In order to refine the accuracy of the signal emitted by each electronic device, each electronic device 5-8 may transmit to the central unit 11 a period of acquisition of said at least two acquisition sequences, said at least two acquisition sequences undergoing filtration in the associated electronic device 5-8 and/or the central unit 11, these filtrations being complementary. Filtration in the central unit 11 is marked 20 in FIG. 2.

The signals associated with the wheel speed sensors 13-16 may be resampled as a function of the period of said at least two sequences and undergo filtration similar to the filtration(s) of said at least two acquisition sequences. The same filter or a filter compatible with the signals of said at least two acquisition sequences may be used in accordance with the sampling period concerned. Thus the same supplementary phase offset is obtained from the digital filtration(s) for signals from the electronic devices 5-8 and signals from the wheel speed sensors 13-16.

There are in principle four constraints for producing a sampling rate. The first constraint is the limited size of the message transmitted, which imposes a need for a maximum number of samples, for example 64 samples maximum. The second constraint is a minimum number of samples per wheel revolution necessary for precise calculation of the phase. The number of samples may be at least six per wheel revolution. This requires a maximum sampling period suitable for high speeds.

The third constraint is the need for a sampling sequence covering at least one wheel revolution, which is necessary to calculate a phase. Finally, the fourth constraint is to transmit the value of the sampling period in order to allow adequate filtration of the signals from the speed sensors, which brings the same supplementary filtration phase offset.

These constraints together lead to two possible solutions. The first solution may be to perform sampling at a fixed predefined period of at least five milliseconds. The second solution may be to perform sampling at a calculated period adapted to the current speed in order to guarantee a fixed number of samples per wheel revolution.

The number of acquisitions per wheel revolution may be a function of a speed of the vehicle V, and diminish as the speed reduces. The desired aim is to guarantee a constant number of samples per wheel revolution, irrespective of the current speed of the wheel. Precisely, if the sampling period is adapted, the number of samples per wheel revolution will not vary from one speed to another. In order to guarantee sixteen samples per wheel revolution, the sampling period may be approximately 20 ms at 20 km/h and 4 ms at 100 km/h.

An aspect of the invention also concerns a motor vehicle V comprising wheels 1-4 each equipped with an electronic device 5-8 which integrates at least one sensor for an operating parameter correlating with the rotation of the associated wheel, and an emitter 10 transmitting the values of said at least one operating parameter to a central unit 11. In parallel, the motor vehicle V comprises a wheel speed sensor 13-16 positioned close to each wheel 1-4 and providing data representative of the rotation of the wheel 1-4 and connected to the central unit 11.

The central unit 11 housed in the vehicle V is firstly equipped with a receiver 12 for receiving values of said at least one parameter originating from the electronic devices 5-8, and secondly connected directly or indirectly to each wheel speed sensor 13-16 in order to receive data representative of the rotation of each wheel 1-4. This connection may take place via a computer 17 forming part of the same safety system as the wheel speed sensors 13-16, for example via an ABS or ESP system mentioned above.

According to an aspect of the invention, the motor vehicle V implements a method as described above. To do this, each electronic device 5-8 comprises means for performing at least two sequences of several acquisitions correlating to the rotation of the wheel. The central unit 11 comprises means for pairing a signal representative of said at least two sequences, separately with each of the signals associated respectively with one of the wheel speed sensors 13-16.

The central unit 11 also comprises means for measuring, for each pair, a phase offset between the signal correlating with the rotation of the wheel associated with the electronic device 5-8 and the signal associated with each wheel speed sensor 13-16. The central unit 11 then comprises means for identifying a constant phase offset between the signal correlating with the rotation of the wheel and the signal from one of the wheel speed sensors 13-16. Finally, the central unit 11 comprises means for attribution and memorization of the electronic device 5-8 for the wheel associated with the wheel speed sensor 13-16, the signal of which has shown a constant phase offset with the signal of the electronic device, with a possibility of variation by a predefined range around a constant phase offset.

The sensor or sensors of an operating parameter integrated in the electronic device 5-8 correlating with a rotation of the associated wheel may be taken individually or in combination from the following elements: a tangential and/or radial accelerometer, an impact sensor, a coil sensitive to the earth's magnetic field, and a Hall effect sensor. Any magneto-static sensor may also be considered.

When said at least one sensor is a coil sensitive to the earth's magnetic field or a Hall effect sensor, the motor vehicle V may comprise a global positioning system on board the motor vehicle V.

In the same way as the coil sensitive to the earth's magnetic field, the Hall effect sensor will be sensitive to the earth's magnetic field and hence to the fluctuations of its longitudinal component as a function of the heading of the vehicle. This is also applicable to any magneto-static sensor.

In fact, as a coil susceptible to the earth's magnetic field uses the earth's magnetic field, it is important to locate the vehicle on the earth. The vehicle 1 may be located via a known global positioning system or GPS on board the vehicle. This function allows the position of the vehicle at all times to be memorized so as to locate the geographic zone of use of the vehicle in which the motor vehicle is traveling. A global positioning system may also serve for forming classified phase offset groups with similar characteristics as a function of geographic parameters, for example concerning the meandering nature of the route, which has a great influence on the phase offset between wheels.

The invention claimed is:

1. A method for locating a position of each wheel of a motor vehicle comprising wheels each equipped with an electronic device which integrates at least one sensor for an operating parameter correlating to a rotation of the associated wheel, and an emitter transmitting values of said at least one operating parameter to a central unit, a wheel speed sensor for each wheel which supplies data representative of the rotation of the associated wheel to the central unit, said location method comprising:

for each electronic device, at least two sequences of several acquisitions of said at least one parameter are performed, which are then transmitted by the electronic device to the central unit by formation of a signal correlating to the rotation of the associated wheel for said at least two sequences, with simultaneous acquisition by the central unit of data representative of the rotation transmitted by each wheel speed sensor by formation of a signal associated with each wheel speed sensor acquired during each of said at least two sequences, a pairing is performed of the signal correlating to the wheel rotation for the electronic device for said at least two sequences with each of the signals associated with each of the wheel speed sensors, for each pair, a phase offset is measured between the signal correlating with the rotation of the wheel associated with the electronic device and the signal associated with each wheel speed sensor, and when a constant phase offset varying within a predefined calibratable range is measured in the pairs of said at least two sequences with the signal associated with the wheel speed sensor, while the other pairs with the signals associated with the other wheel speed sensors have a greater or variable phase offset, the electronic device associated with said at least one signal correlating with the rotation of the wheel is identified as being assigned to the wheel associated with the wheel speed sensor which emitted the signal of the wheel speed sensor having a constant phase difference from the signal of the electronic device, the method being continued for associating a wheel of the vehicle to each electronic device.

2. The method according to that claim 1, wherein the predefined calibratable range varies from +/−0 to 15%, being a function of a travel of the motor vehicle (V).

3. The method according to claim 2, wherein when no constant phase offset is measured in any of the pairs with the signals associated with the wheel speed sensors, or when the phase offsets of the pairs with the signals associated with the wheel speed sensors are similar, the method is suspended for said at least two acquisition sequences.

4. The method according to claim 1, wherein when no constant phase offset is measured in any of the pairs with the signals associated with the wheel speed sensors, or when the phase offsets of the pairs with the signals associated with the wheel speed sensors are similar, the method is suspended for said at least two acquisition sequences.

5. The method according to claim 1, wherein the central unit memorizes the recorded phase offsets and classifies these into measured phase offset groups with similar characteristics as a function of the following parameters taken alone or in combination: a journey of the vehicle corresponding to a specific speed or within a range of 20% around a specific speed, a journey with one or more phases of stoppage or deceleration of the vehicle, or a meandering course of the route followed.

6. The method according to claim 1, wherein for a classified phase offset group with similar characteristics as a function of said parameters and composed of a set of phase offsets, a mean phase offset value and a standard deviation of phase offset around this mean value are established, this mean phase offset value and the standard deviation phase offset being applied to a new journey with said characteristics of the group, the phase offset of said new journey being then stored in the group and the standard deviation of the phase offsets being updated taking into account the phase offset of the new journey.

7. The method according to claim 1, wherein each electronic device transmits to the central unit an acquisition period of said at least two acquisition sequences, said at least two acquisition sequences undergoing filtration in the associated electronic device and/or the central unit.

8. The method according to claim 1, wherein the signals associated with the wheel speed sensors are resampled as a function of the period of said at least two sequences and undergo filtration similar to the filtration(s) of said at least two acquisition sequences.

9. The method according to claim 1, wherein each acquisition sequence corresponds to a minimum wheel revolution and/or a period of an acquisition sequence of at least five milliseconds.

10. The method according to claim 1, wherein sampling is performed at a fixed and predefined period of at least five milliseconds or a period calculated and adapted to the current speed in order to guarantee a fixed number of samplings per wheel revolution.

11. A motor vehicle comprising wheels each equipped with an electronic device which integrates at least one sensor for an operating parameter correlating to a rotation of the associated wheel and an emitter transmitting values of said at least one operating parameter to a central unit, the motor vehicle comprising a wheel speed sensor positioned close to each wheel which supplies data representative of the rotation of the associated wheel to said central unit, the central unit housed in the vehicle being firstly equipped with a receiver for receiving the values of said at least one parameter from the electronic devices, and secondly connected to each wheel speed sensor for receiving data representative of the rotation of each wheel, wherein it implements a method according to claim 1, wherein each electronic device comprises means for implementing at least two sequences of several acquisitions correlating to the rotation of the wheel, the central unit comprises means for pairing a signal representative of said at least two sequences separately with each of the signals associated respectively with one of the wheel speed sensors, and means for measuring for each pair a phase difference between the signal correlating with the rotation of the wheel associated with the electronic device and the signal associated with each wheel speed sensor, means for identifying a constant phase difference between the signal correlating with the wheel rotation and a signal from one of the wheel speed sensors, and means for attribution and memorization of the electronic device for the wheel associated with the wheel speed sensor, the signal of which has shown a constant phase difference from the signal of the electronic device.

12. The motor vehicle according to claim 11, wherein said at least one sensor of an operating parameter integrated in the electronic device correlating with a rotation of the associated wheel is taken individually or in combination from the following elements: a tangential and/or radial accelerometer, an impact sensor, a coil sensitive to the earth's magnetic field, a magneto-static sensor, and a Hall effect sensor.

13. The motor vehicle according to claim 12, wherein when at least one sensor is a coil sensitive to the earth's magnetic field, a magneto-static sensor or a Hall effect sensor, the motor vehicle comprises a global positioning system on board the motor vehicle.

* * * * *